No. 863,941. PATENTED AUG. 20, 1907.
J. M. ROBBINS.
WHEELWRIGHT MACHINE.
APPLICATION FILED JUNE 5, 1906.

2 SHEETS—SHEET 1.

Witnesses
C. K. Reichenbach.
H. C. MacCartney.

Inventor
J. M. Robbins.
By Chandlee & Chandlee
Attorneys.

THE NORRIS PETERS CO., WASHINGTON, D. C.

No. 863,941. PATENTED AUG. 20, 1907.
J. M. ROBBINS.
WHEELWRIGHT MACHINE.
APPLICATION FILED JUNE 5, 1906.
2 SHEETS—SHEET 2.
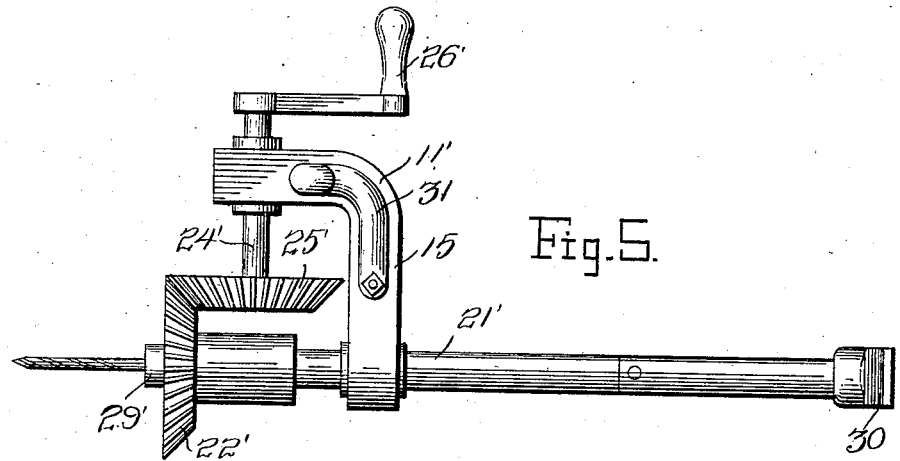
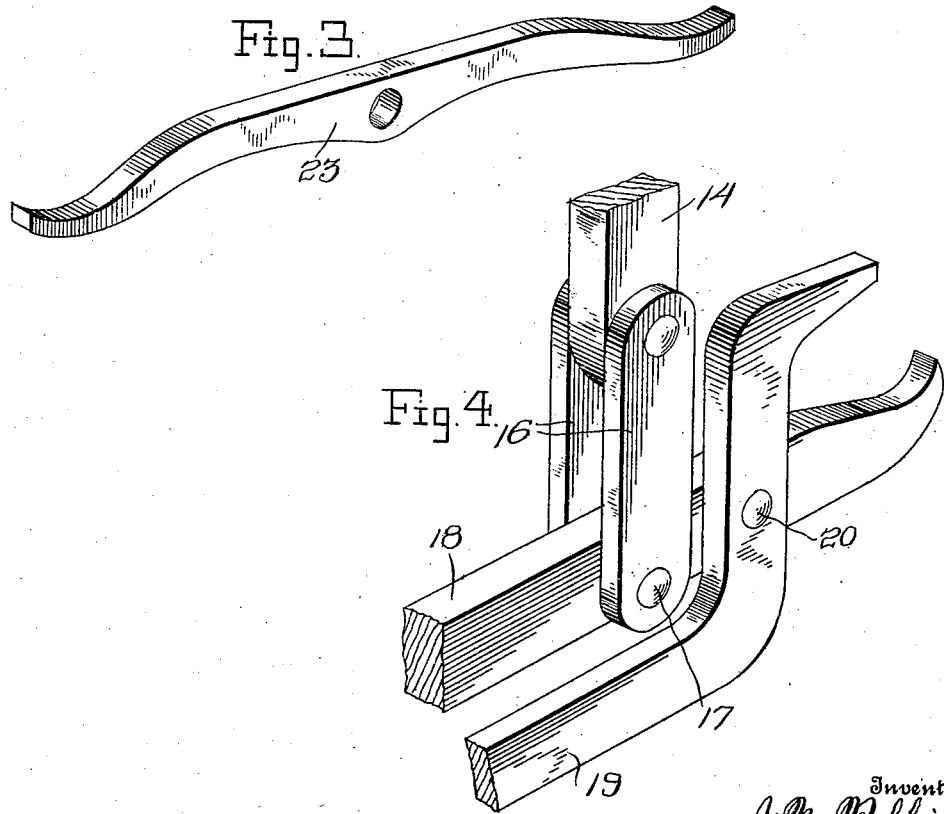

UNITED STATES PATENT OFFICE.

JAMES M. ROBBINS, OF ROCHELLE, TEXAS.

WHEELWRIGHT-MACHINE.

No. 863,941.

Specification of Letters Patent.

Patented Aug. 20, 1907.

Application filed June 5, 1906. Serial No. 320,331.

*To all whom it may concern:*

Be it known that I, JAMES M. ROBBINS, a citizen of the United States, residing at Rochelle, in the county of McCulloch, State of Texas, have invented certain new and useful Improvements in Wheelwright-Machines; and I do hereby declare the following to be a full, clear, and exact description of the invention, such as will enable others skilled in the art to which it appertains to make and use the same.
This invention relates to wheelwright machines, the object thereof, in general, being to provide a simple, inexpensive, durable and efficient hand-operated machine embodying means for drilling the felly and tire of a vehicle wheel for the reception of the tire retaining bolts.

The particular improvements consist in the construction of a machine of the above mentioned type, comprising a pair of sections detachably connected together, the front section carrying a pair of pliers mounted in a pair of ears pivotally connected with the outer end thereof, to grasp the wheel rim and move the entire machine forwardly, thus advancing the drill or bolt wrench carried by the rear section.

Further improvements consist in the construction of the rear section in such manner that it may be readily detached from the front section and operated singly as a breast drill or bolter.

With these and other objects in view, the present invention consists in the combination and arrangement of parts, as will be hereinafter more fully described, shown in the accompanying drawings, and particularly pointed out in the appended claims, it being understood that changes in the form, proportion, size and minor details may be made, within the scope of the claims, without departing from the spirit or sacrificing any of the advantages of the invention.

Figure 1:
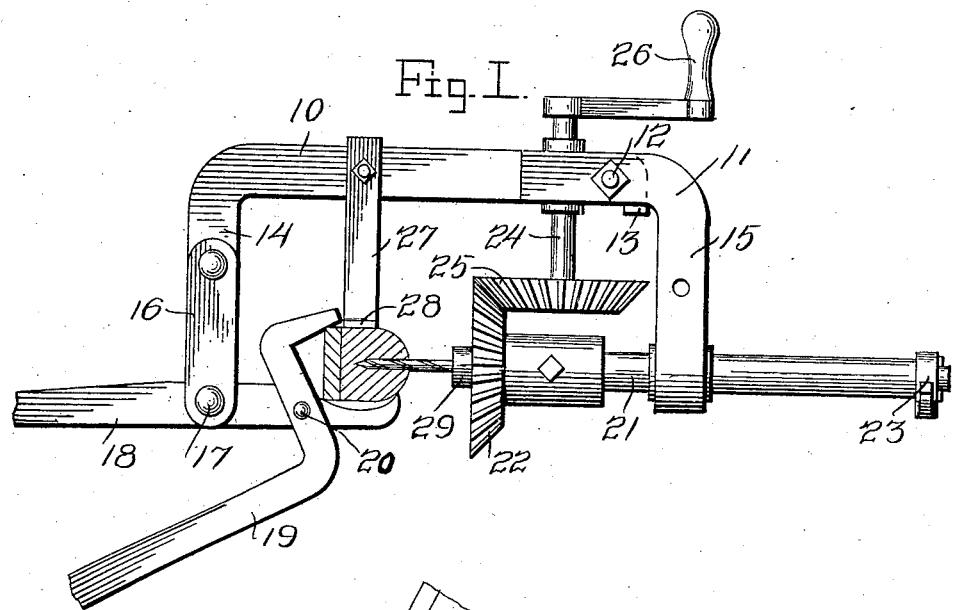
Figure 2:
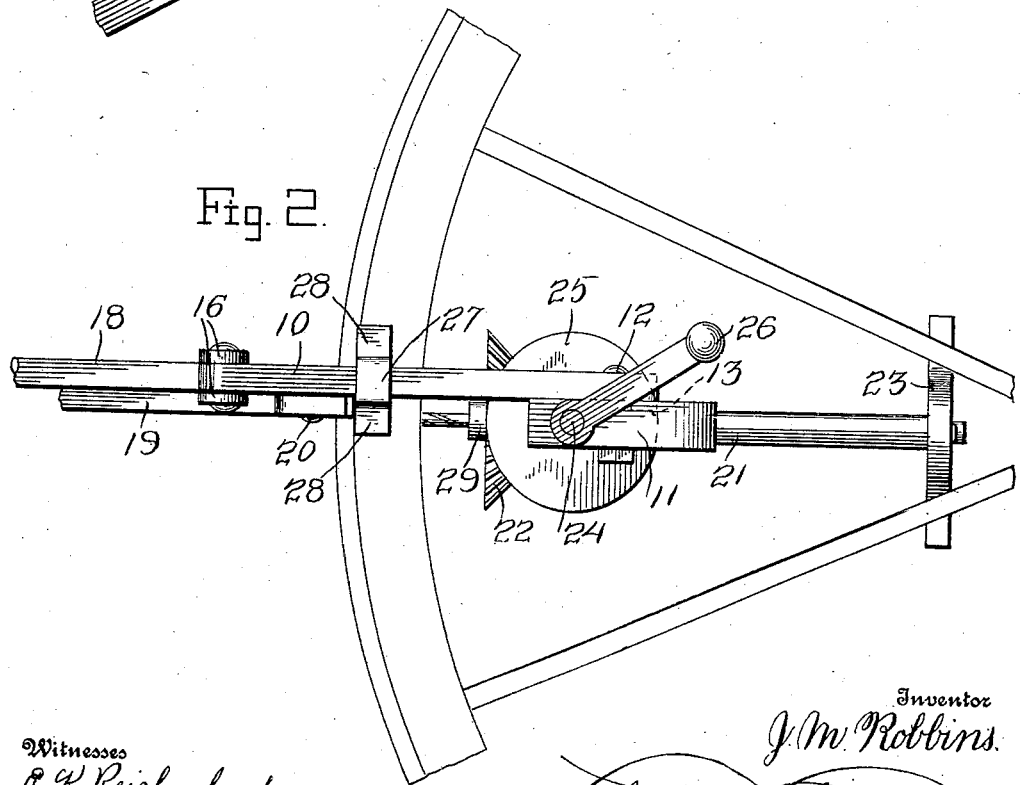

In the drawings:—Figure 1 is a side view of my invention. Fig. 2 is a plan view illustrating its application to a wheel. Fig. 3 is a detail view of the spoke engaging member. Fig. 4 is a detail view of the pliers illustrating upon an enlarged scale its mounting with respect to the frame. Fig. 5 is a detail view of the machine converted into a breast drill.

Referring to the drawings, 10 and 11 designate respectively, the front and rear sections of the machine, detachably connected by a bolt 12, as shown in Fig. 1, the front section being formed with an integral inwardly extending flange or shoulder 13, at its inner end, upon which the rear section rests and is more completely held in place. Said sections are provided, respectively, with downward extensions 14 and 15, the former having pivotally connected thereto, at its lower end, a pair of ears 16, in which is secured by a pivot-pin 17, the upper member 18 of a pair of pliers. The jaw and handle of said member 18 are approximately in direct line with each other, while the inner end of the lower member 19 is bent upwardly and then inwardly, at right angles to its upward bend, as shown in Fig. 4. The pivot bolt 20, of said members, is located at the rear of ears 16.

The depending extension 15 of the rear section 11 is provided adjacent its lower end with an opening, in which is rotatably mounted a drill shank 21, said drill shank carrying on one end a sleeve rigidly connected thereto and formed with an integral bevel gear 22. On its opposite end said drill shank carries a spoke-engaging member 23 loosely surrounding the same and held in place thereon by a bolt or pin. The member 23 has curved portions projecting on each side of the shank 21, as shown, and is of sufficient length to engage a pair of wheel spokes.

To rotate the drill shank, a vertical shaft 24 is mounted in the rear section 11, and carries at its lower end a beveled gear 25, meshing with the gear 22 on said shank, a crank handle 26 being provided at the upper end of said shaft. The front section 10 carries a vertical brace 27, extending on opposite sides thereof, and bolted thereto, as shown, said brace being provided with broadened and flattened ends 28, designed to engage the wheel rim directly over the part thereof through which the bolt hole is to be drilled. The drill shank is provided with the usual socket 29 for a drill or bolt wrench.

In the operation of the machine, the wheel to be drilled is firmly attached to its bench, and the machine then placed in position thereon, with its spoke-engaging member in place beneath a pair of spokes, as shown in Fig. 2, the flattened ends of brace 27 being directly over the part through which the bolt hole is to be drilled. The shaft 24 is then rotated, driving the drill shank, and starting the hole in the wheel rim. As the bit feeds into the felly in forming its bore the machine is necessarily moved therewith, and in such movement the member 23 and the brace 27 slide over the surface of the parts upon which they bear, thus constituting guides for the machine in its movement due to the action of the bit. As the machine is thus advanced, the pliers, owing to their pivotal suspension from the ears 16 and owing to the pivotal suspension of the latter from the ears 14, may be kept in engagement with the felly, the double pivotal suspension above noted thus compensating for the movement of the machine with the bit. The jaw of the upper plier member 18 is formed with a slight upward bend at its outer end to enable it to more firmly clamp the wheel rim.

To convert the machine into a breast drill, as shown in Fig. 5, it is only necessary to remove the front section 10, and to the rear end of the shank attach the breast piece 30, the spoke engaging member having first been detached therefrom. The drill, when used in such manner, is provided with a brace 31 attached to the side of the section, as shown. The remaining parts of the construction shown in Fig. 5 are identical with those shown in the first described construction, and are designated by corresponding primed numerals.

While the device has been described as a drill, it is obvious that a bolt wrench may be substituted for a drill and the bolts thus tightened in the bolt holes.

From the foregoing, it will be seen that my machine is portable; that is, that it is not suspended from or secured to a wall or post, but is of such proportions that it may be readily carried from one place to another.

What is claimed, is:—

A machine of the type set forth comprising a frame provided with a rear depending portion and a front depending portion, a tool shank rotatably mounted in said rear depending portion, and provided at one end with a socket for an operating tool, and at the other end with a member adapted to engage the under side of the article to be operated upon, a brace depending from said frame forwardly of said member, and adapted to engage the upper side of the article to be operated upon, an operating tool in said socket, means for rotating said tool shank, ears pivotally depending from said front depending member, and pliers including crossed pivoted members terminating in gripping jaws, the uppermost of said members being pivoted to said ears at a point forwardly of its pivotal connection with the lowermost of said members.

In testimony whereof, I affix my signature, in presence of two witnesses.

JAMES M. ROBBINS.

Witnesses:
 A. W. MILLER,
 B. L. BROWN.